(12) United States Patent
Elenbaas

(10) Patent No.: US 9,407,073 B2
(45) Date of Patent: Aug. 2, 2016

(54) GUIDING SUPPORT AND KIT FOR TERMINATING A TRANSMISSION CABLE

(71) Applicant: Tyco Electronics Nederland BV, S'-Hertogenbosch (NL)

(72) Inventor: Jacco Elenbaas, Heyningen (NL)

(73) Assignee: TE Connectivity Nederland BV, S-Hertogenbosch (NL)

( * ) Notice: Subject to any disclaimer, the term of this patent is extended or adjusted under 35 U.S.C. 154(b) by 55 days.

(21) Appl. No.: 14/167,455

(22) Filed: Jan. 29, 2014

(65) Prior Publication Data
US 2014/0209762 A1 Jul. 31, 2014

(30) Foreign Application Priority Data
Jan. 29, 2013 (EP) .................................... 13153034

(51) Int. Cl.
*H02G 3/04* (2006.01)
*G02B 6/38* (2006.01)
*G02B 6/44* (2006.01)

(52) U.S. Cl.
CPC ............ *H02G 3/0437* (2013.01); *G02B 6/3887* (2013.01); *G02B 6/3879* (2013.01); *G02B 6/4471* (2013.01)

(58) Field of Classification Search
CPC .. H02G 3/0437; G02B 6/3887; G02B 6/3879; G02B 6/4471
USPC ........................................................ 248/49
See application file for complete search history.

(56) References Cited

U.S. PATENT DOCUMENTS

| | | | | |
|---|---|---|---|---|
| 4,330,172 A * | 5/1982 | Monaghan et al. | ............. | 385/60 |
| 4,611,887 A * | 9/1986 | Glover et al. | .................. | 385/71 |
| 4,645,295 A * | 2/1987 | Pronovost | ....................... | 385/55 |
| 4,687,291 A * | 8/1987 | Stape et al. | ...................... | 385/59 |
| 4,936,662 A * | 6/1990 | Griffin | ............................. | 385/77 |
| 5,016,968 A * | 5/1991 | Hammond et al. | ............. | 385/78 |
| 5,076,656 A * | 12/1991 | Briggs et al. | .................... | 385/71 |
| 5,259,052 A * | 11/1993 | Briggs et al. | .................... | 385/78 |
| 5,268,982 A * | 12/1993 | Schaffer et al. | ................. | 385/86 |
| 5,692,080 A * | 11/1997 | Lu | ................................... | 385/60 |
| 6,240,228 B1* | 5/2001 | Chen et al. | ...................... | 385/53 |
| 6,267,514 B1* | 7/2001 | Chen et al. | ...................... | 385/71 |
| 6,276,841 B1* | 8/2001 | Demangone | ..................... | 385/76 |
| 6,358,086 B1* | 3/2002 | Gallagher et al. | ............. | 439/538 |
| 6,688,776 B2* | 2/2004 | Simmons et al. | ............... | 385/53 |
| 7,031,574 B2* | 4/2006 | Huang et al. | ..................... | 385/39 |
| 7,128,471 B2* | 10/2006 | Wilson | ............................. | 385/78 |
| 7,150,567 B1* | 12/2006 | Luther et al. | ..................... | 385/78 |
| RE40,622 E * | 1/2009 | Lu | ................................... | 385/60 |
| 7,540,667 B2* | 6/2009 | Murano | ............................. | 385/60 |
| 8,152,385 B2* | 4/2012 | de Jong et al. | .................. | 385/71 |
| 8,376,629 B2* | 2/2013 | Cline et al. | ....................... | 385/78 |
| 2003/0194187 A1* | 10/2003 | Simmons et al. | ............... | 385/53 |
| 2005/0018967 A1* | 1/2005 | Huang et al. | ..................... | 385/39 |
| 2005/0249466 A1* | 11/2005 | Wilson | ............................. | 385/78 |
| 2006/0269194 A1* | 11/2006 | Luther et al. | ..................... | 385/78 |
| 2007/0036487 A1* | 2/2007 | Grzegorzewska et al. | ...... | 385/53 |

(Continued)

*Primary Examiner* — Peter Radkowski
(74) *Attorney, Agent, or Firm* — Barley Snyder

(57) ABSTRACT

A guiding support for guiding a transmission line is disclosed having a holding structure positioned on a rear end and engageable with a fixation member of an end cap. A seat is positioned on a front end of the guiding support, and is engageable with an adapter member of a terminal. A first transmission line receiving channel is positioned along a longitudinal axis of the guiding support from the rear end to the front end.

13 Claims, 10 Drawing Sheets

(56) References Cited

U.S. PATENT DOCUMENTS

| | | | |
|---|---|---|---|
| 2007/0211998 A1* | 9/2007 | Muhlegg et al. | 385/62 |
| 2009/0034911 A1* | 2/2009 | Murano | 385/59 |
| 2009/0245732 A1* | 10/2009 | Murano | 385/59 |
| 2010/0080517 A1* | 4/2010 | Cline et al. | 385/92 |
| 2010/0220961 A1* | 9/2010 | de Jong et al. | 385/77 |
| 2011/0217008 A1* | 9/2011 | Cline et al. | 385/78 |
| 2011/0299814 A1* | 12/2011 | Nakagawa | 385/78 |
| 2012/0007717 A1* | 1/2012 | Jong | 340/10.4 |
| 2012/0063723 A1* | 3/2012 | Jenkins et al. | 385/78 |

* cited by examiner

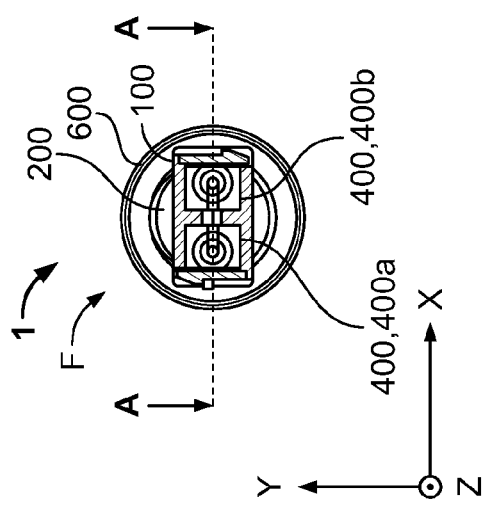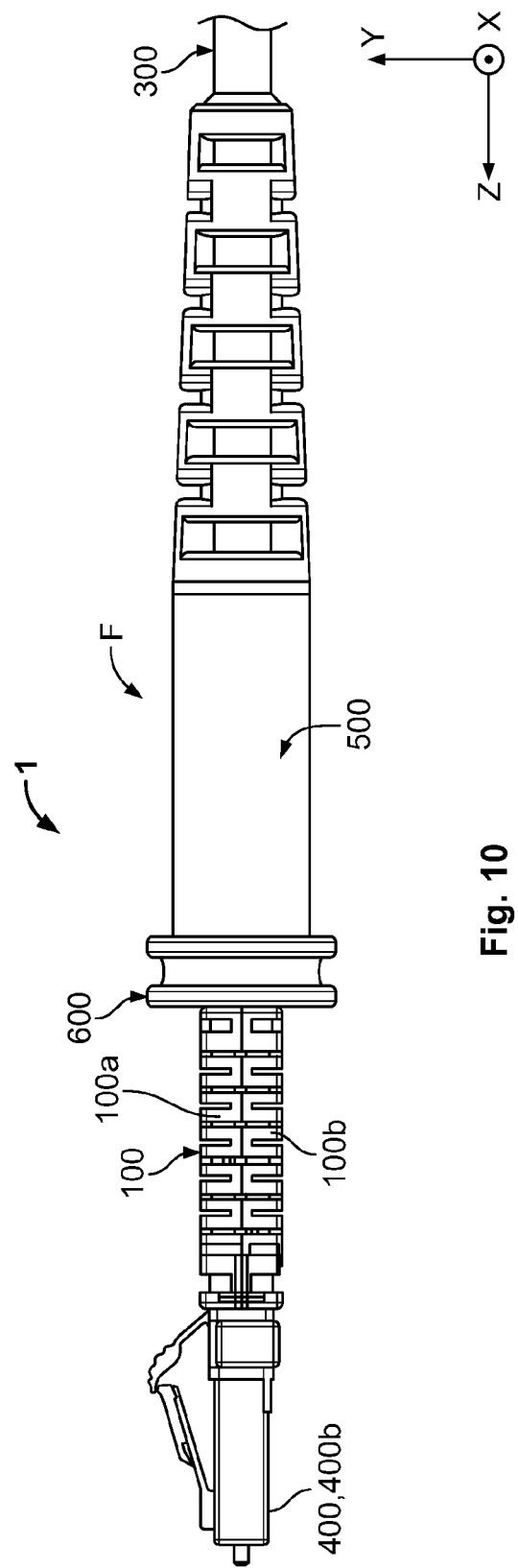

GUIDING SUPPORT AND KIT FOR TERMINATING A TRANSMISSION CABLE

CROSS REFERENCE TO RELATED APPLICATION

This application claims the benefit of the filing date under 35 U.S.C. §119 (a)-(d) of European Patent Application No. 13 153 034.7, filed on Jan. 29, 2013.

FIELD OF THE INVENTION

The present invention relates to a guiding support for a transmission cable, and more specifically, to a terminal unit for terminating a transmission cable.

BACKGROUND

Fiber optic cables and transmission lines are routinely used in a number of applications and are often used as units having a fiber element with several individual fibers. Multiple fibers are generally bundled together, and housed in a cable. The fibers themselves are long and thin, making them prone to damage by snapping and cracking, and requiring a source of strain relief to reduce external stresses.

Conventionally, strain relief is achieved by surrounding a fiber, bundle of fibers, or all lines in the cable with a layer of Kevlar. A connector is attached to a terminating end by crimping a ferrule around the layer of Kevlar. Alternatively, strain is relieved by incorporating a flexible rod centrally through the entire length of the cable. Then, instead of attaching to the layer of Kevlar, the connector is attached to a terminating end by crimping a ferrule around the rod.

These conventional methods present several disadvantages, namely a certain over-length of the transmission line may occur. Within a tight cable, the over-length may be cumbersome to store, and a high compression force is required to be applied to the ferrule, which can exceed international standards on a maximum compression crimping force allowed.

Additionally, it is common for the transmission line to be affixed within an enclosure with the help of additional means such as adapters. Thus, convention methods require both a crimping action, followed by affixing the terminal end within an enclosure, meaning two separate actions are necessary for terminating the cable. Therefore, whether using the Kevlar layer or the central rod, terminating the cable so that strain relief is achieved may be cumbersome and time-consuming.

SUMMARY

It is therefore an object of the invention, among other objects, to provide a guiding support for guiding a transmission line, the guiding support having a holding structure positioned on a rear end and engageable with a fixation member of an end cap. A seat is positioned on a front end of the guiding support, and is engageable with an adapter member of a terminal. A first transmission line receiving channel is positioned along a longitudinal axis of the guiding support from the rear end to the front end.

BRIEF DESCRIPTION OF THE DRAWINGS

The invention will now be described by way of example with reference to the accompanying figures, of which:

FIG. 9 is a front view of terminal unit in the assembled state;
FIG. 10 is a side view of the terminal unit illustrated in FIG. 9.

DETAILED DESCRIPTION OF THE EMBODIMENTS

Figure 1:
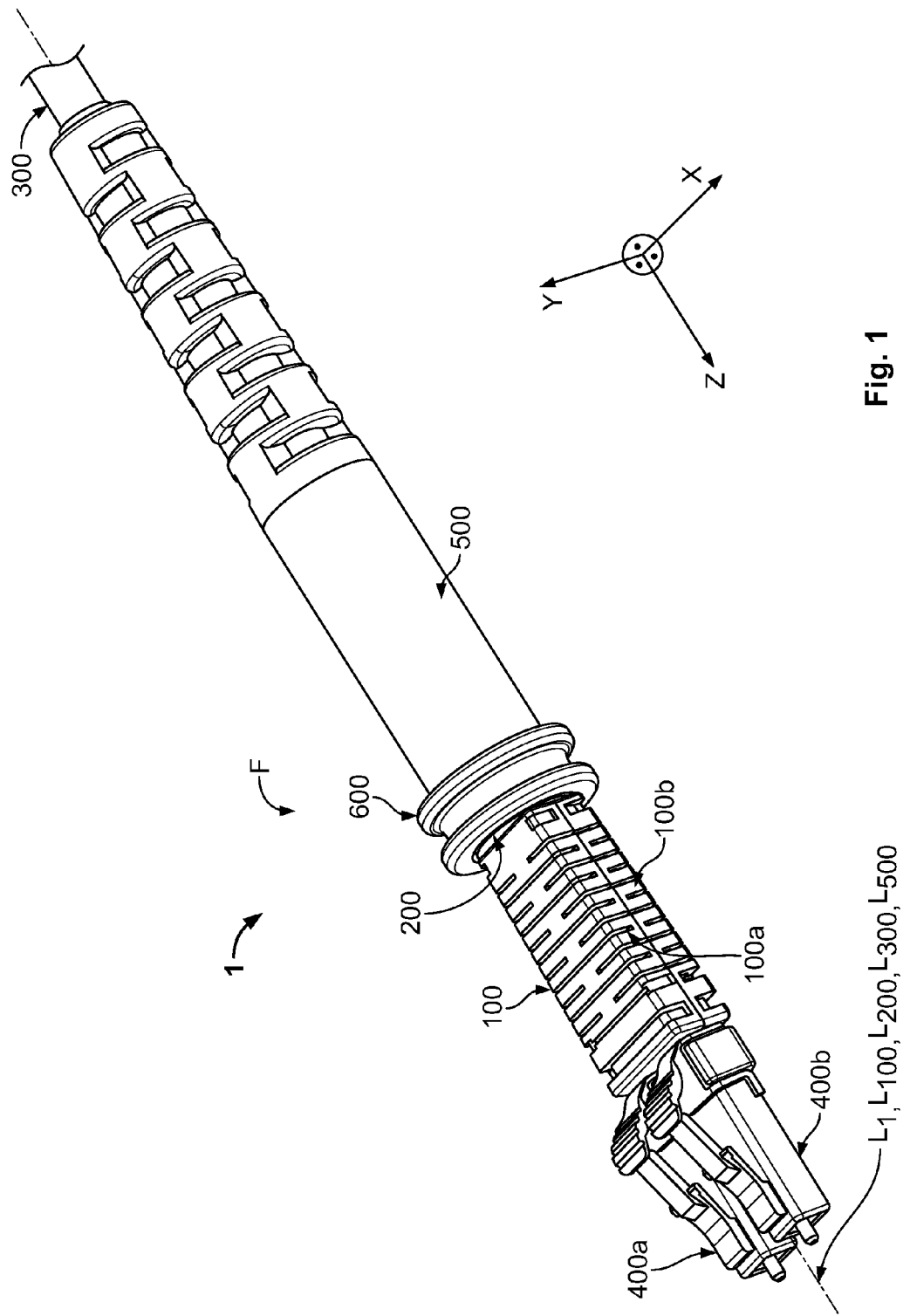
FIG. 1 is a perspective view of a terminal unit.

As illustrated in FIG. 1, a terminal unit 1 includes a guiding support 100 and an end cap 200 for terminating a transmission cable 300, while also providing strain relief between a transmission line 303 and at least one terminal 400, such as terminal 400*a* and terminal 400*b*. The terminal unit 1 is positioned such that a longitudinal axis L100 of the guiding support 100, a longitudinal axis L200 of the end cap 200 and a longitudinal axis L300 of the transmission cable 300 are essentially superimposed upon each other and thereby constitute a common longitudinal axis L1 of the terminal unit 1. The longitudinal axis L1 extends essentially in parallel to a longitudinal direction Z. The longitudinal direction Z runs essentially perpendicularly to a lateral direction X. The lateral direction X and the longitudinal direction Z run essentially perpendicularly to a vertical direction Y. In other words, the lateral direction X, the vertical direction Y and the longitudinal direction Z essentially constitute a Cartesian coordinate system.

The guiding support 100 has an upper shell 100*a* and a lower shell 100*b*, which are latched or locked in the assembled state F and are stacked upon each other in the vertical direction Y. A boot 500 at least partially surrounds the end cap 200 and the cable 300. The boot 500 may be molded around the end cap 200 and the cable 300, so that a longitudinal axis L500 of the boot 500 may essentially be superimposed with the longitudinal axis L1 of the terminal unit 1. A seating member 600 may be provided to facilitate the mounting of the terminal unit 1 to the cable 300. The seating member 600 may have the form of an O-ring snugly encompassing the end cap 200.

Figure 2:
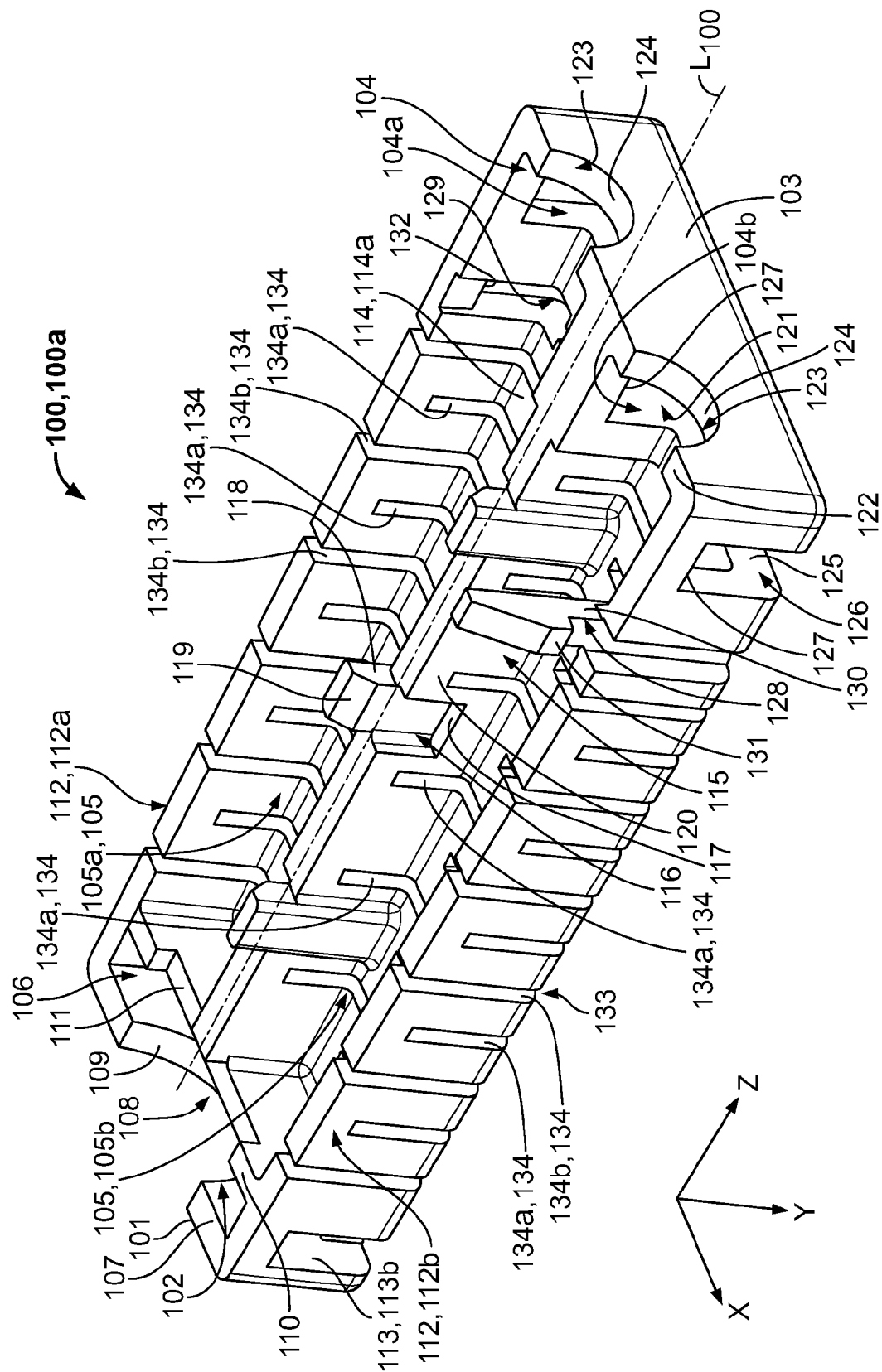
FIG. 2 is a perspective view of a shell of a guiding support.

FIG. 2 shows the guiding support 100, in particular the upper shell 100*a*. At the rear end 101, the guiding support 100 has a receiving space 102 to receive a fixation member 201 of the end cap 200. At a front end 103, the guiding support 100 includes seats 104, in particular a first seat 104*a* and a second seat 104*b*, which receive and seat the first terminal 400*a* and the second terminal 400*b*, respectively. Channels 105, in particular a first channel 105*a* and a second channel 105*b*, extend from the receiving space 102 to the seats 104 along the longitudinal direction Z to hold and protect at least one transmission line 303 each.

The receiving space 102 comprises a slot 106 extending essentially perpendicularly to the longitudinal extension of the channels 105. In other words, the slot 106 extends essentially in the plane along the lateral direction X and the vertical direction Y. Towards the rear end 101, the slot 106 is at least partly limited by a rear wall 107. A rear opening 108 may be in the form of a semi-circular rear cut-out 109 in the rear wall 107. Towards the channels 105, the slot 106 may be bordered by a divider 110 wall serving as a divider between the receiving space 102 and the channels 105. A passage 111 is notched on an inward surface of the divider 110 to form a passageway from the receiving space 102 to the channels 105, through the divider 110 when the upper shell 100a and the lower shell 100b are assembled, so that transmission lines can pass through the divider 110 via the passage 111. Laterally, the receiving space 102, in particular the slot 106, may be bordered by respective sidewalls 112 of the guiding support 100, in particular a first sidewall 112a and a second sidewall 112b. Counter fixation members 113, in particular a first counter fixation member 113a and a second counter fixation member 113b, respectively, may be formed in the sidewalls 112a and 112b, respectively. The counter fixation members 113 may be formed as indentations in order to take up fixation elements formed at a fixation member of the end cap 200.

The channels 105 may be laterally bordered by the sidewalls 112. A longitudinal wall 114, in particular a top wall 114a, may border the channels 105 in the vertical direction Y, in particular towards the top of the upper shell 100a. The channels 105 may be separated from each other by a partition 115 wall extending in the plane along the longitudinal direction Z and the vertical direction Y between the channels 105. In FIG. 2, an upper partition 115a is shown. The top wall 114a may be provided with interlacing elements 116 that interlace with complementary formed interlacing elements 116 on the lower shell 100b in order to enhance stability of the partition 115. The interlacing elements 116 may comprise a notch 117 formed complementary to a stud 118 of the interlacing elements 116. In order to facilitate an engagement of opposing interlacing elements 116 formed at the upper shell 100a and the lower shells 100b, the stud 118 may be provided with a bevel 119.

A bridge 120 between the rear end 101 and the front end 103 may be formed from a central part of the partition 115 in the vicinity of the longitudinal axis L100 of the guiding support 100. In the illustrated embodiment in FIG. 2, the bridge connects the divider 110 to the seats 104, so that forces may be transferred from the end cap 200 to the terminals 400 via the bridge. Thereby, strain relief between the end cap 200 and the terminals 400 may be provided.

The seats 104 may each comprise a clearance 121 configured to take up an adapter member 700 for holding the terminals 400. Towards the front end 103, the clearance 121 may be bordered by a front wall 122. A front opening 123 in the front wall 122 may be in the form of a semi-circular front cut-out 124. Towards the channels 105, each seat 104, in particular each clearance 121, is bordered by an edge 125 formed in the longitudinal wall 114, in particular the top wall 114a of the upper shell 100a shown in FIG. 2. The edge 125 is defined by a recess 126 which may extend essentially in parallel to the lateral direction X through the sidewalls 112 and the partition 115. The recess 126 additionally helps to define counter latching elements 127 of the seat 104 in that edges 127 for supporting latching elements 128,129 of the adapter members 700 are provided.

Locking elements 128 and counter locking elements 129 may be formed at the upper shell 100a, to engage with respective counter locking elements 129 and locking elements 128, respectively, formed on the lower shell 100. Engagement of the locking elements 128 with their corresponding counter locking elements 129 retain the upper shell 100a and the lower shell 100b in the assembled state F. The locking elements 128 may be formed as latching tongues 130 provided with noses 131 engageable with complementary detents 132 on the counter locking elements 129.

The guiding support 100 may be provided with a grooved structure 133. The grooved structure 133 may be formed by staggered slits 134. The slits 134 may be provided as first slits 134a and second slits 134b, essentially extending in a plane running in the lateral direction X and the vertical direction Y. The first slits 134a may extend partly through the sidewalls 112 and partly through the longitudinal wall 114, as well as partly through the partition 116, where they may be limited by the bridge 120. The second slits 134b may extend through the entire sidewalls 112 and partly through the longitudinal wall 114, but not into the partition 116. The first and second slits 134a, 134b may be offset so that they provide the grooved structure 133 of the sidewalls 112, the longitudinal walls 114 and the partition 116. The slits 134 enhance a flexibility of the guiding support 100 in the lateral direction X and the vertical direction Y.

Figure 3:
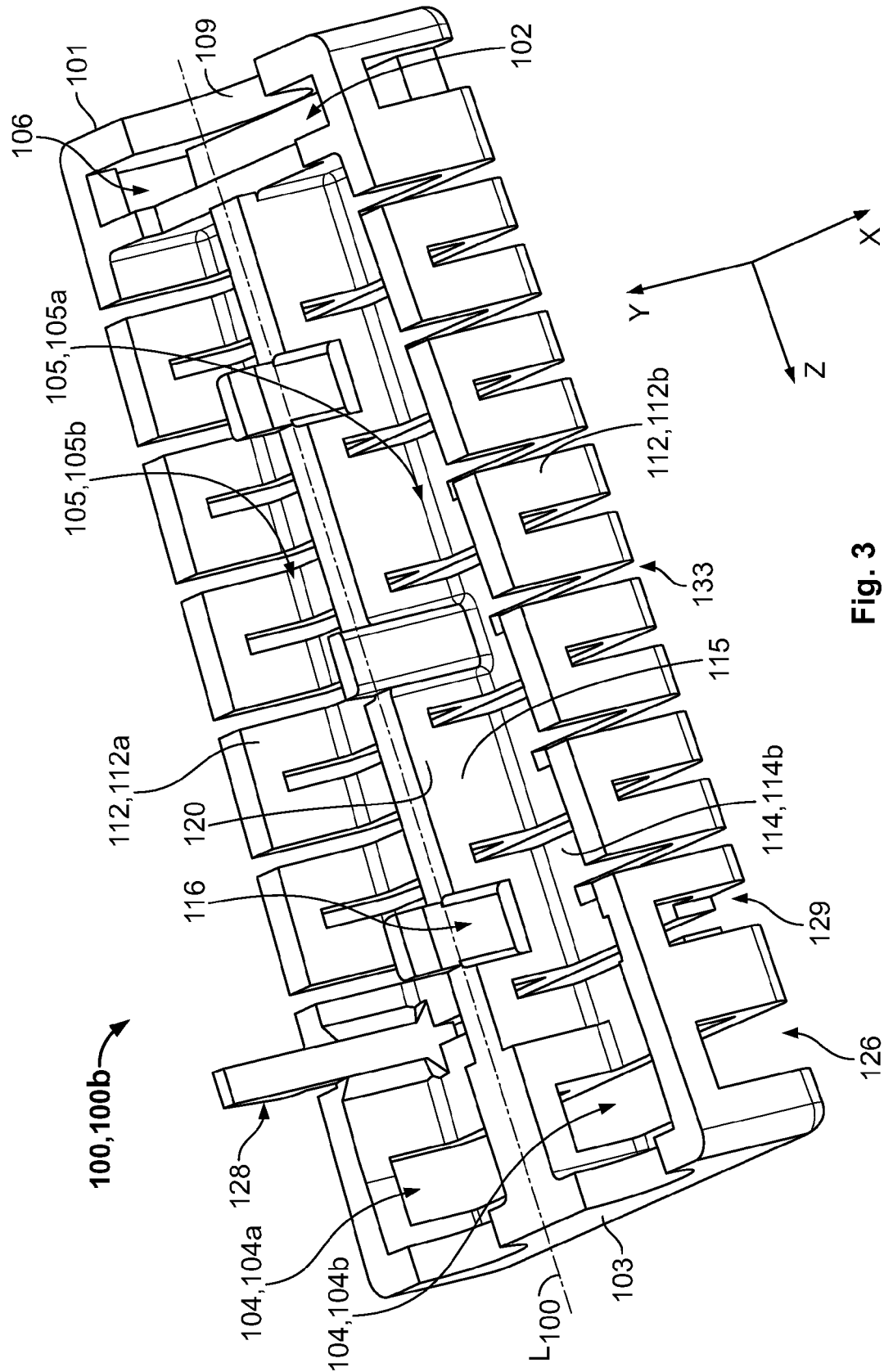
FIG. 3 is another perspective view of a shell of a guiding support.

FIG. 3 illustrates the lower shell 100b, which is identical and complementary to the upper shell 100a. Hence, the lower shell 100b may comprise a receiving space 102 at its rear end 101 and seats 104 arranged at its front end 103. Channels 105 may extend from the receiving space 102 to the seats 104. The channels 105, in particular 105a and 105b may be laterally bordered by sidewalls 112a and 112b, respectively. The longitudinal wall 114 may vertically border the channels 105 and may provide a bottom wall 114b of the guiding support 100. The partition 115 may separate the channels 105.

Further, the interlacing elements 116 may be provided which may overlap with the corresponding interlacing elements 116 on the upper shell 100a. The locking element 128 and the counter locking element 129 may be provided for locking the lower shell 100b with the upper shell 100a in the assembled state F by engaging with the counter locking element 129 and the locking element 128, respectively, provided at the upper shell 100a. The grooved structure 133 may be provided, so that the flexibility of the guiding support 100 allowing for bending the guiding support 100 in the lateral direction X and/or vertical direction Y exceeds the flexibility of the guiding support 100 in the longitudinal direction Z. At the same time, the bridge 120 may allow for transferring stresses between the holding structure and the seats 104 in order to thus provide strain relief between the end cap 200 received in the receiving space 102 and the terminals 400 received in the seats 104.

Figure 4:
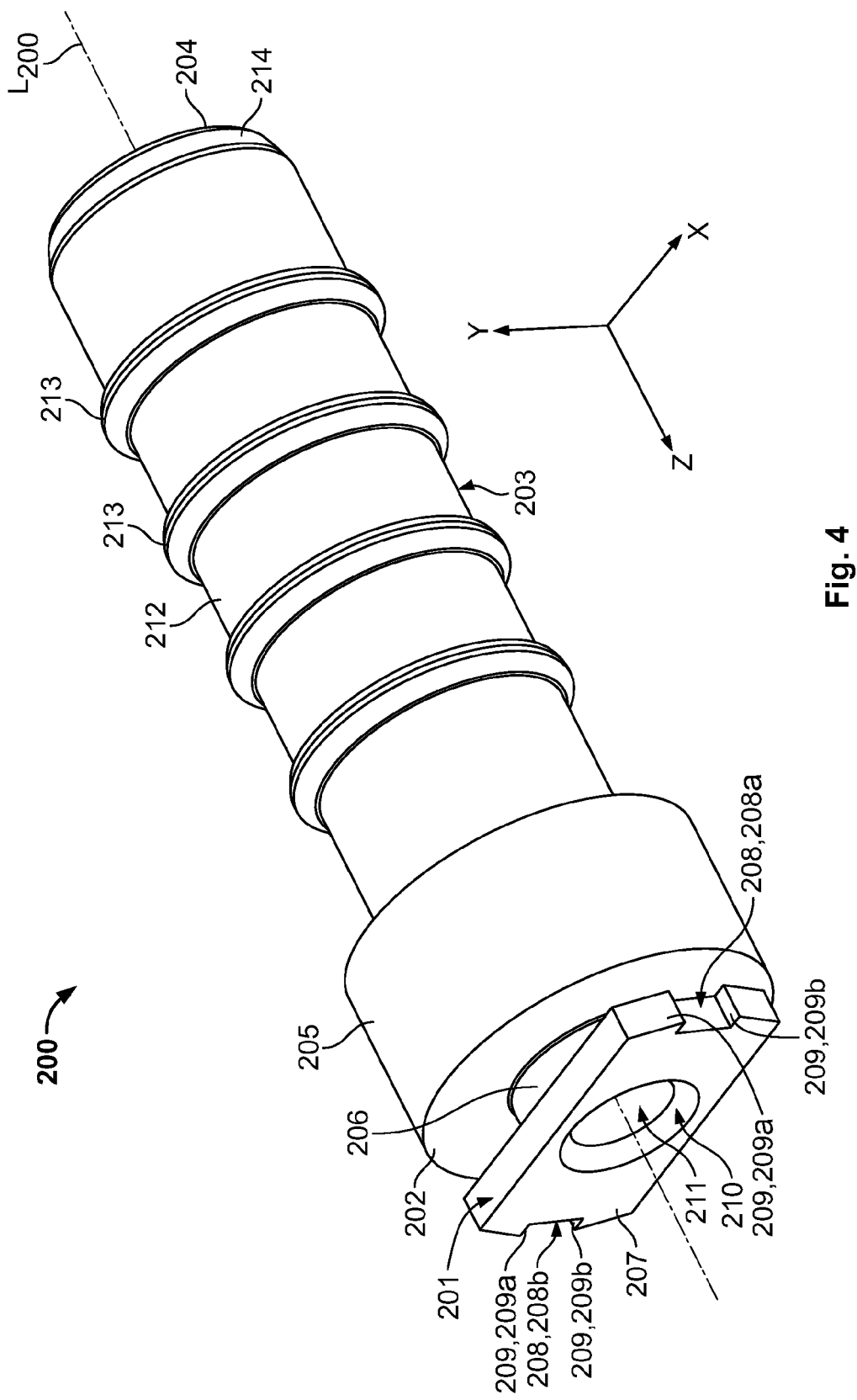
FIG. 4 is a perspective view of an end cap.

The end cap 200 is illustrated in FIG. 4, and includes a fixation member 201 at the front end 202 and a cable attachment section 203 extending against the longitudinal direction Z from the front end 202 towards a rear side 204 of the end cap 200. The fixation member 201 and the cable attachment section 203 may be separated from each other by a collar 205 which may have an essentially annular shape.

The fixation member 201 is an essentially annular base extending from the front side 202 in the longitudinal direction Z and being arranged concentrically to the longitudinal axis L200 of the end cap 200. A plate 207 may be arranged concentrically to the longitudinal axis L200 of the end cap 200 at an end of the base 206 facing in the longitudinal direction Z. Lateral edges of the plate 207 may be provided with fixation structures 208, in particular a first fixation structure 208a and a second fixation structure 208b assigned to the first counter fixation member 113a and the second counter fixation member 113b, respectively, of the guiding support 100. Each fixation structure 208 may be provided with fixation elements 209, in particular an upper fixation element 209a and a lower fixation element 209b. The fixation elements 209 may be formed as protrusions engageable with the counter fixation members 113 by engaging with the indentations of the counter fixation members 113.

An outlet 210 may be arranged concentrically to the longitudinal axis L200 of the end cap 200 so that transmission lines 303 may exit a through-hole 211 extending through the end cap 200 concentrically to the longitudinal axis L200 of the end cap 200. The cable attachment section 203 of the end cap 200 may comprise an essentially tubular body 212 which is arranged and formed concentrically with respect to the longitudinal axis L200 of the end cap 200. At its outer circumference, the body 212 may be provided with several annular ribs 213 which enhance the stability of a connection between the cable attachment section 203 and the cable 300 and/or the boot 500. Attaching the cable 300 to the end cap 200 may be facilitated by a circumferential bevel 214 provided at the rear side 204 of the end cap 200.

Figure 5:
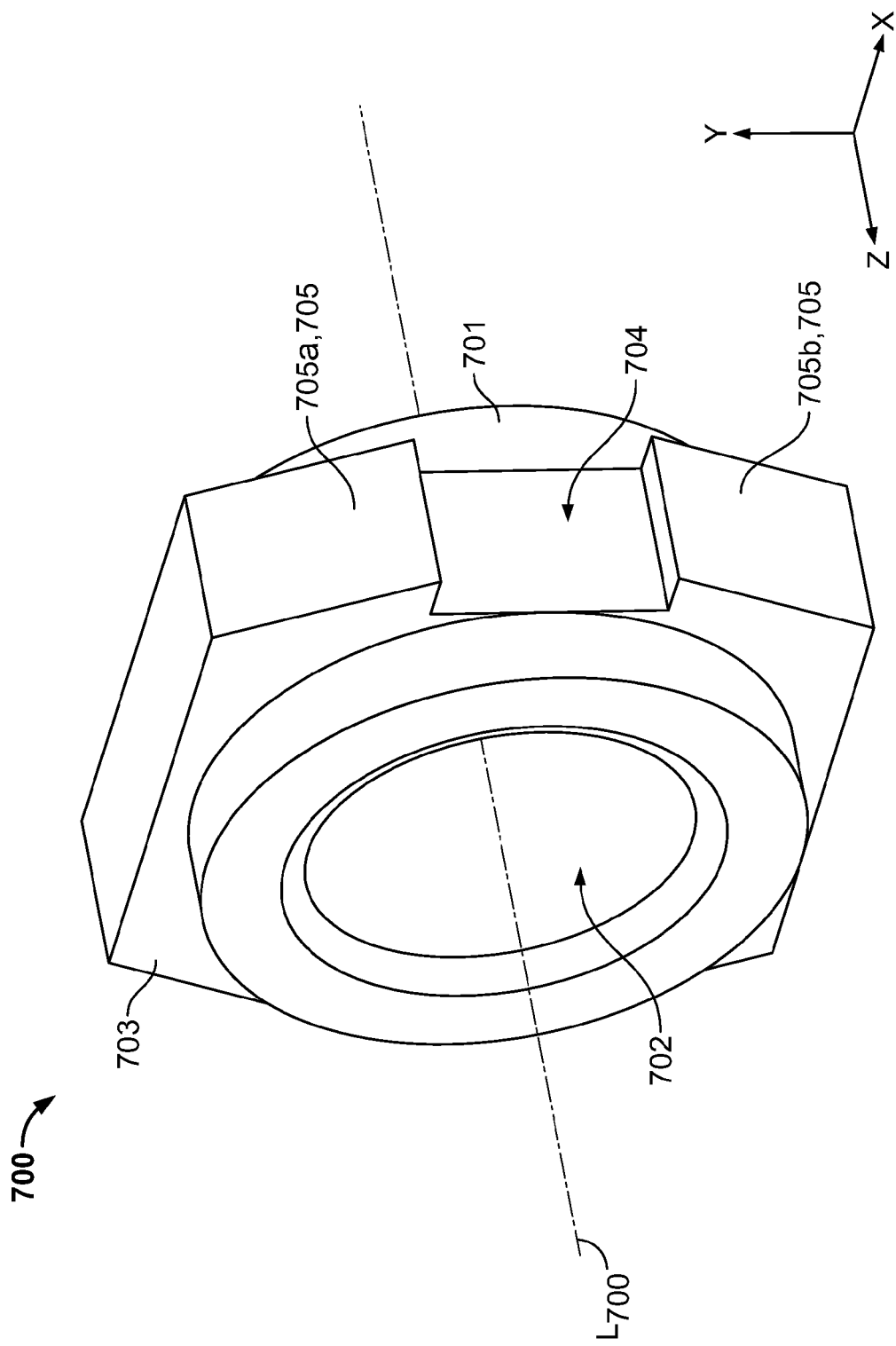
FIG. 5 is a perspective view of an adapter member.

As illustrated in FIG. 5, an adapter member 700 having a base body 701 with an through hole 702 through which a longitudinal axis L600 of the adapter member 700 extends essentially in parallel to the longitudinal direction Z. A frame 703 circumferentially surrounds the base body 701 or may be formed along an outer circumference. The frame 703 may be provided at both lateral sides with latching members 704. Each of the latching members 704 may comprise at least one latching element 705, in particular an upper latching element 705a and a lower latching element 705b, which engage with the counter latching elements 127 formed at the upper shell 100a and the lower shell 100b, respectively.

Figure 6:
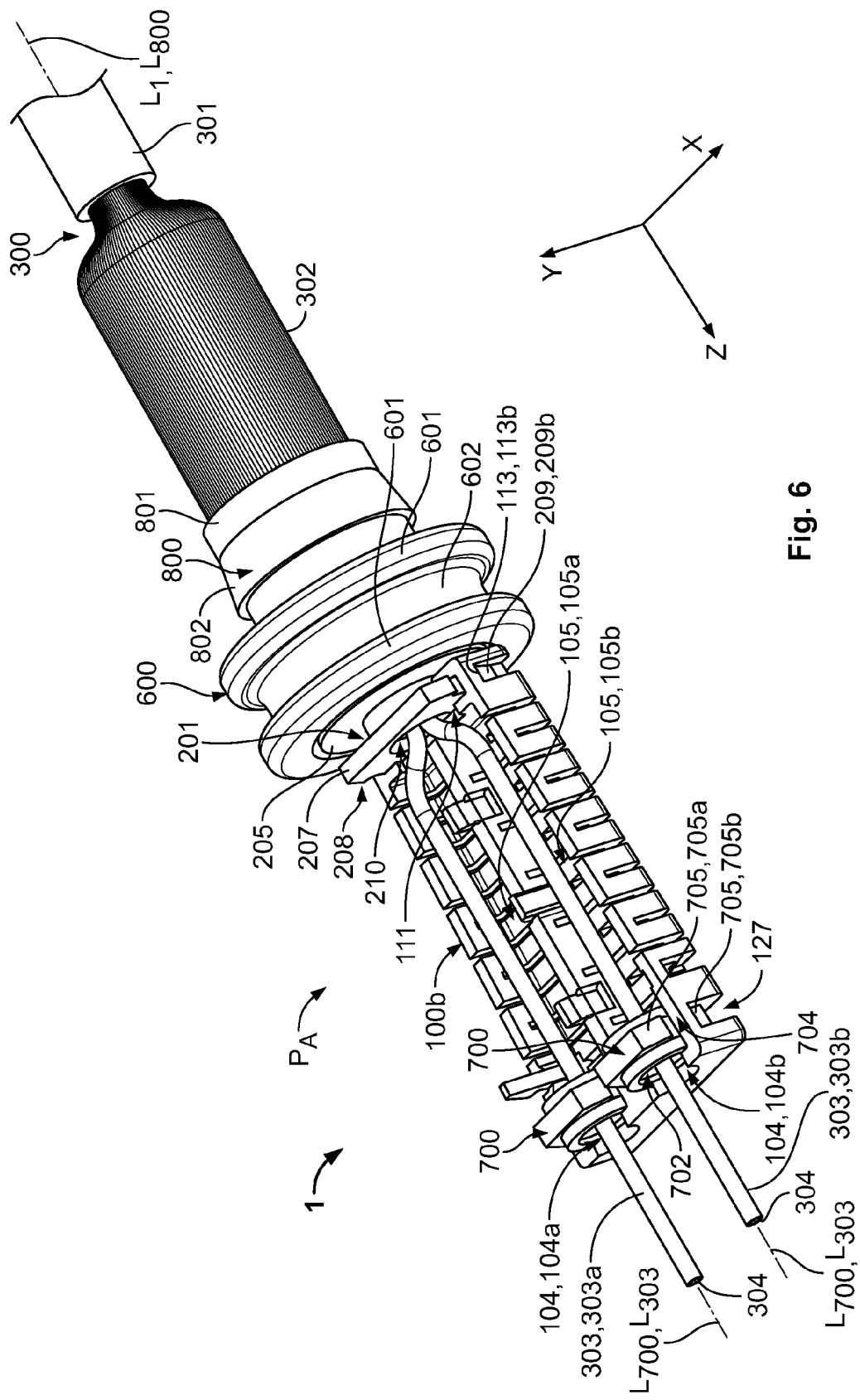
FIG. 6 is a perspective view of a terminal unit in a first pre-assembled state.

FIG. 6 shows a schematic perspective view of the terminal unit 1 in a first pre-assembled state PA. In the first pre-assembled state PA, the cable 300 may be stripped such that a sheath 301 of the cable 300 is at least partly removed towards an end of the cable 300 to be terminated by the terminal unit 1. Underneath the sheath 301, a strength member and/or braid 302 may be positioned. The strength member 302 may be pulled over the cable attachment section 203 of the end cap 200. In other words, the cable attachment section 203 may be inserted into the strength member 302. At the same time, at least one transmission line 303 may be pulled through the through-hole 211 of the end cap 200, such that the transmission line 303 exits the end cap 200 through the outlet 210.

Additionally, the terminal unit may comprise a rim 800. The rim 800 may comprise a tubular section 801 and a hoop 802 which may circumferentially surround the tubular section 801. The rim 800 may be arranged circumferentially around the strength member 302 and may about the collar 205 of the end cap 200. Thereby, the strength member 302 may be positioned between the cable attachment section 203, or at least a free end section of the strength member 302 pointing in the longitudinal direction Z may be covered by the rim 800 in order to be protected and held in place.

The fixation structure 208 of the end cap 200 may be received in the receiving space 102 such that the fixation structure 208 engages with the counter fixation member 113 of the guiding support 100. In particular, the lower fixation elements 209b of the fixation structure 208 may be in engagement with the counter fixation members 113 of the lower shell 100b as shown in FIG. 6. Thereby, the lower shell 100b may be connected to the end cap 200 to form a tray-like structure.

The lines 303, in particular a first transmission line 303a and a second transmission line 303b, may run through the channels 105a and 105b, respectively, from the receiving space 102 via the passage to the seats 104a and 104b, respectively. At least one adapter member 700 may be received in each of the seats 104. The latching members 704 of the adapter members 700 may be in engagement with the counter latching elements 127 arranged laterally at the seats 104. In particular, the lower latching element 705b of each of the adapter members 700 may engage the respective counter latching element 127, so that the adapter members 700 are captively held within the seats 104. The lines 303 may extend through the through holes 702 of the adapter members in such a way that a longitudinal axis L303 of each line 303 essentially superimposes the respective longitudinal axis L700 of the adapter member 700. Free ends 304 of the lines 303 pointing in the longitudinal direction Z may be already received in a terminal 400, each, while the adapter members 700 may each hold a terminal 400.

Further, the seat member 600 may be fitted around the collar 205 of the end cap 200. The seating member 600 may encompass the collar 205. The seating member 600 may be provided with two circumferential beadings 601 which may define a circumferential groove of the seating members 600 between them in order to facilitate a mounting and sealing of the terminal unit 1.

Figure 7:
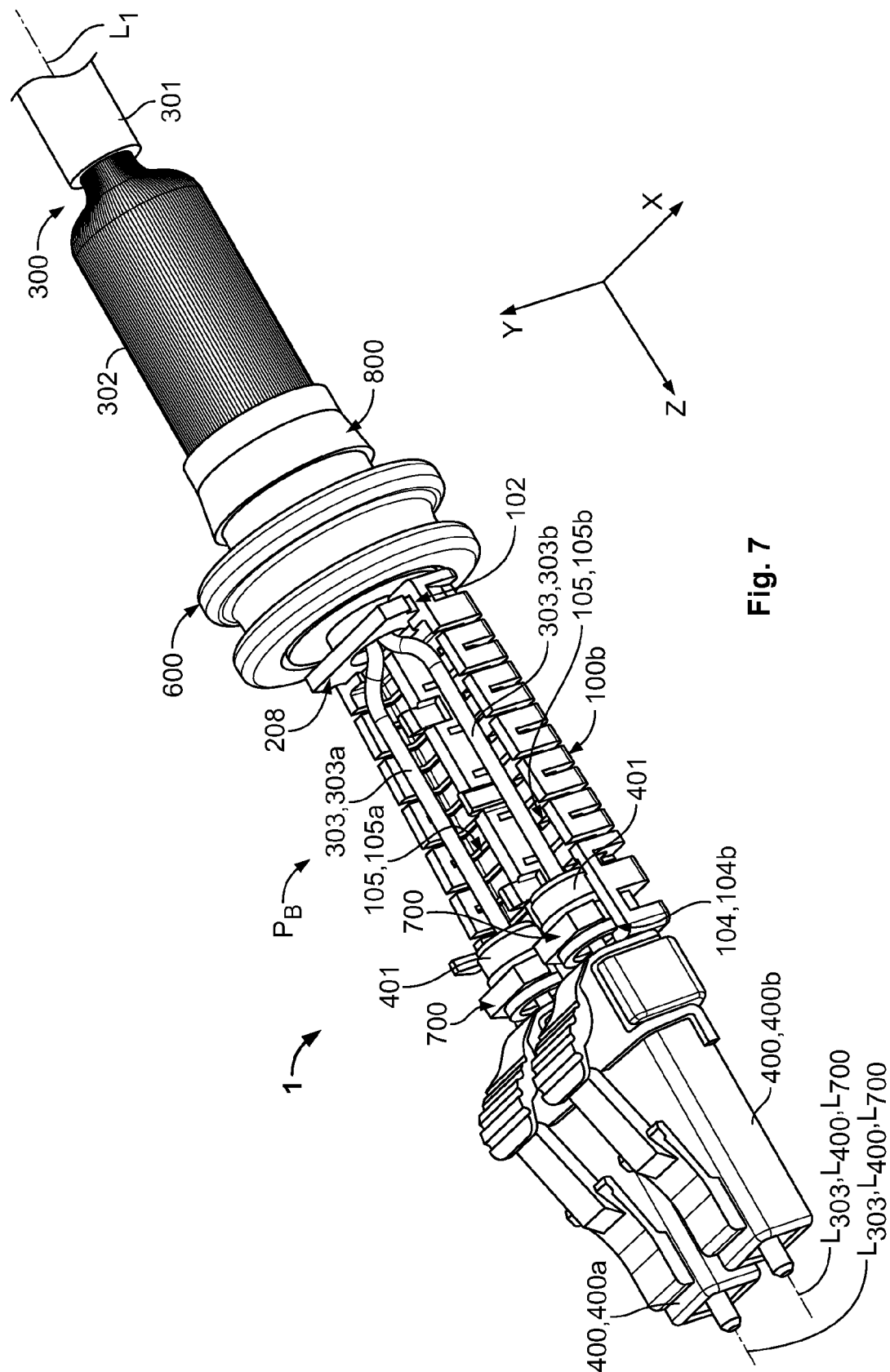
FIG. 7 is a perspective view of a terminal unit in a second pre-assembled state.

FIG. 7 shows a schematic perspective view of a second pre-assembled state PB of the terminal unit 1. Here, in contrast to the first pre-assembled state PA illustrated in FIG. 6, each adapter member 700 holds a terminal 400 for each of the lines 303. In particular, the line 303a may be terminated by the terminal 400a, which is provided with the adapter member 700 received in the seat 104a. Accordingly, the line 303b may be terminated by the 400b, which is provided with the adapted member 700 received in the seat 104b. The terminals 400 may be provided with adapter members 700 before placing the adapter members 700 into the seat 104. Thereby, the terminals 400 with the adapter members 700 may be handled as a single component. Each of the terminals 400 may be provided with a mounting section 401. The mounting section 401 may be formed as a tubular extension of the terminal 400 protruding opposite to the longitudinal direction Z. At least one line 303 may enter the terminal 400 through the mounting section 401.

Figure 8:
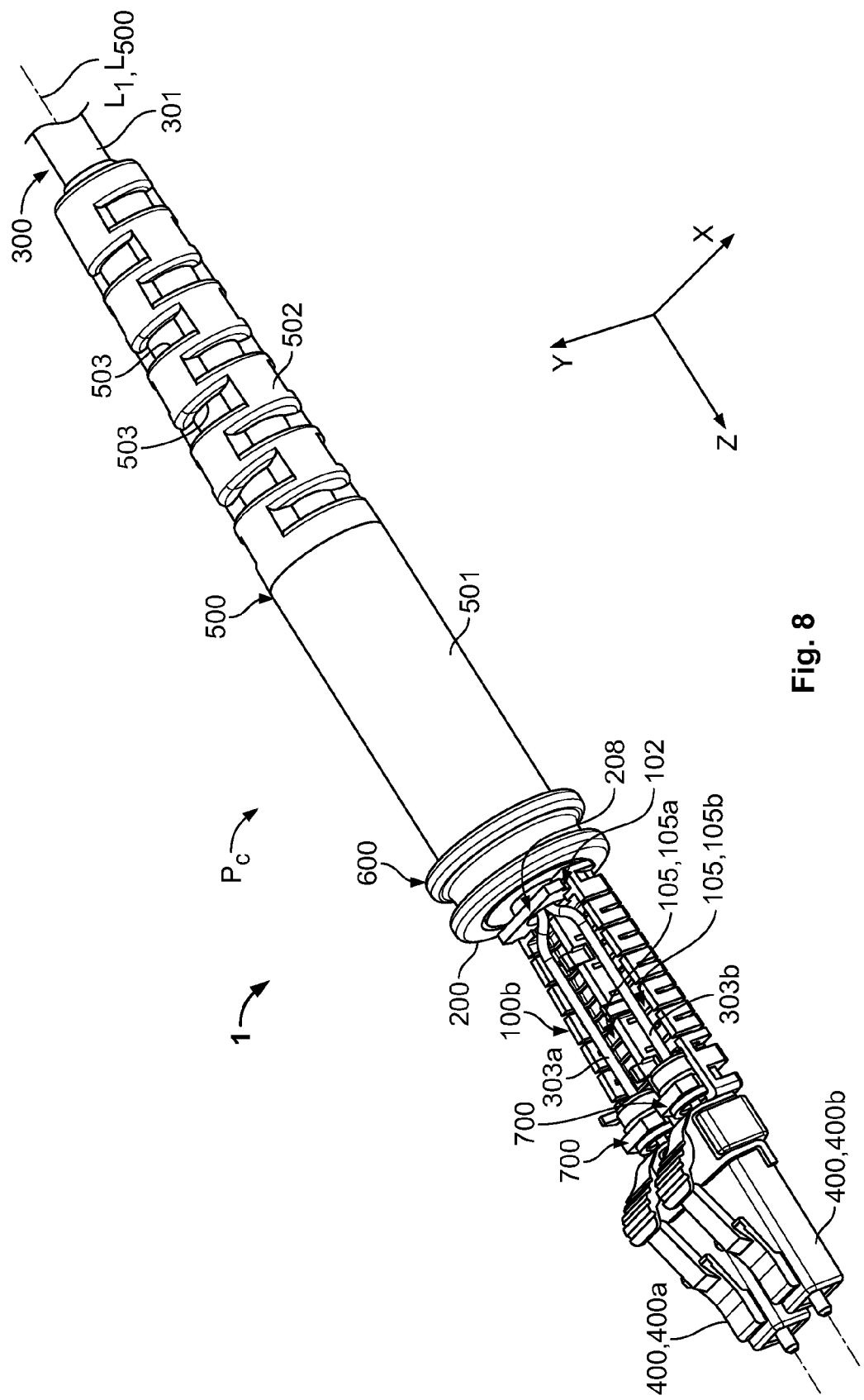
FIG. 8 is a perspective view of a terminal unit in a third pre-assembled state.

FIG. 8 shows a schematic perspective view of the terminal unit 1 in a third pre-assembled state PC. The third pre-assembled state PC differs from the pre-assembled state PB illustrated in FIG. 7 in that the terminal arrangement 1 additionally comprises the boot 500. The boot 500 at least partly circumferentially surrounds the end cap 200 and the cable 300. A main section 501 of the boot 500 may have an essentially tubular form and may essentially surround the cable attachment section 203 of the end cap 200 as well as the rim 800 and the strength member 302 up to an end section of the sheath 301 with which the main section 501 may overlap. A transition section 502 of the boot 500 may extend away from the main section 501 against the longitudinal direction Z and may taper in a direction opposite to the longitudinal direction Z. The transition section 502 may be provided with notches 503 enhancing an overall flexibility of the transition section 502 in order to facilitate a handling or bending of the terminal unit 1 in the region of the transition section 502. The boot 500 may be attached to the terminal unit 1 by molding before or after providing the lines 303 with terminals 400.

FIG. 9 shows a schematic front view of the terminal unit 1 in the assembled state F. The terminals 400a and 400b are held side by side in the lateral direction X by the guiding support 100. Hence, the terminals 400a and 400b are aligned such that mating the terminals with any socket or other kind of mating connector is facilitated. An outer diameter of the seating member 600 may exceed an outer diameter of the terminals 400a and 400b, measured in the vertical direction Y and in the lateral direction. Therefore the terminals 400 and the guiding support 100 may be introduced to an enclosure in the longitudinal direction Z and the seating member 600 may serve for affixing the terminal unit 1 at an opening of the enclosure.

FIG. 10 shows a schematic side view of the terminal unit 1 in the assembled state F. The guiding support 100 forms a bridge between the end cap 200 with the seating member 600 and the boot 500 robustly holding the cable 300 at one side, as well as holding the terminals 400 at the other side, so that a strain relief between the cable 300 and the terminals 400 is provided and the lines 303 are protected against undue stresses, especially against pulling forces acting between the cable 300 and the terminals 400.

Figure 11:
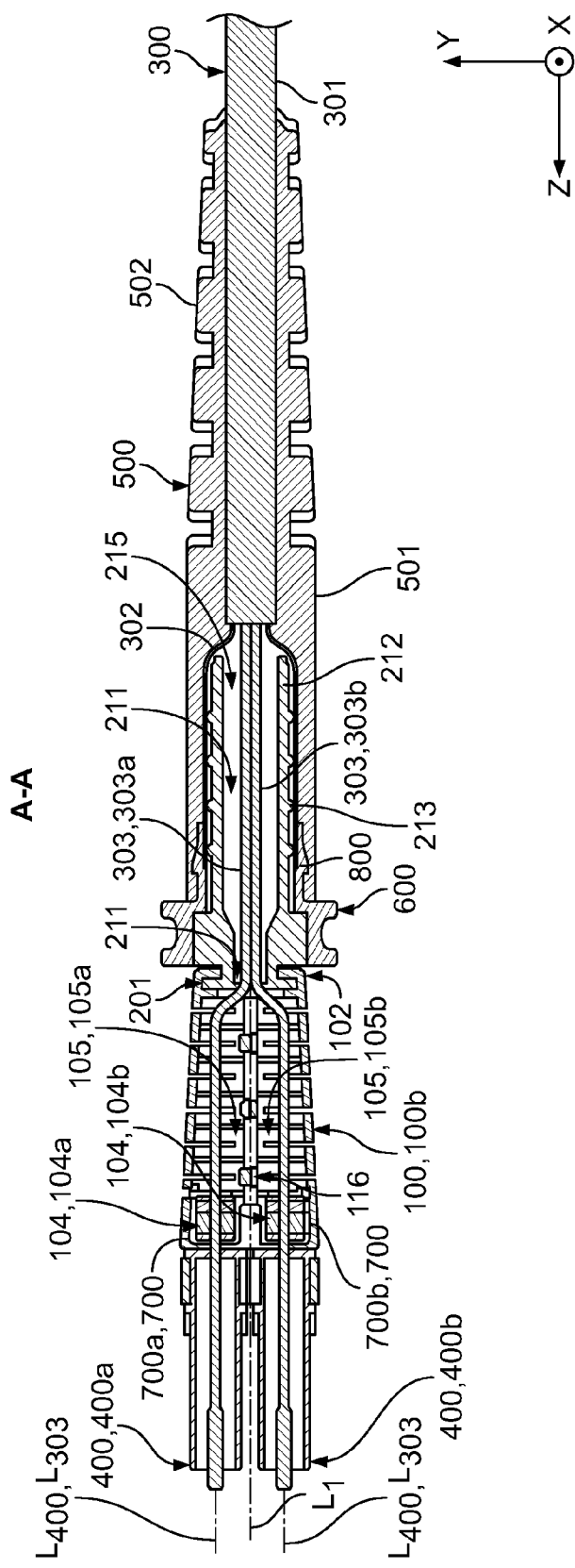
FIG. 11 is a cross-sectional view of the terminal unit illustrated in FIGS. 9 and 10 along the sectional line A-A depicted in FIG. 9.

FIG. 11 shows a schematic cross-sectional view along the cross-sectional line A-A depicted in FIG. 9. The strength member 302 and the end of the sheath 301 may be fully surrounded by the main section 501 of the boot 500. The strength member 302 may be firmly held between the boot 500 and the body 212. The end section of the strength member 302 pointing in the longitudinal direction Z may be additionally protectively held by the rim 800 surrounding it. The lines 303 may be inserted through an inlet 215 at the rear side 204 into the through-hole 200. Then, the lines 303 may be guided through the through-hole 211 and exit the end cap 200 via the outlet 210 at the fixation member 201 which may be firmly held in the receiving space 102 of the guiding support 100. The lines 303 may then be separated in the region of the passage 111 between the receiving space 102 and the channels 105.

In the channels 105, the lines 303 may be guided in such a way that an over-length of the lines 303 may be compensated in the free space provided laterally in the lateral direction X, vertically in the vertical direction Y, and longitudinally in the longitudinal direction Z. The lines 303 may then enter the terminals 400 through their respective mounting section 401, and may be firmly held by a respective adapter member 700 in the respective seat 104 of the guiding support 100. The fixation member 201 and the adapter members 700 may be fully immobilized in that they are encompassed by the receiving space 102 and the seats 104, respectively, because the upper shell 100*a* and the lower shell 100*b* are locked together in the assembled state by the fixation elements 209, latching elements 705 and/or locking elements 128 and counter locking elements 129. The interlacing elements 116 may stabilize the partition 115 between the channels 105.

Those of ordinary skill in the art would appreciate that deviations from the above-described embodiments are possible within the inventive idea. A terminal unit 1 may comprise guiding supports 100, end caps 200, transmission lines 303, terminals 400, boots 500, seating members 600, adapter members 700 and/or rims 800 in whatever number and form desired for a specific application.

The guiding support 100 may comprise an upper shell 100*a* and a lower shell 100*b* and may have rear ends 101, holding structures 102, front ends 103, seats 104, channels 105, slots 106, rear openings 108, rear cut-outs 109, dividers 110, passages 111, sidewalls 112, counter fixation members 113, longitudinal walls 114, partition walls 115, interlacing elements 116, cut-outs 117, studs 118, bevels 119, bridges 120, clearances 121, front walls 122, front openings 123, front cut-outs 124, edges 125, recesses 126, counter latching elements 127, locking elements 128, counter locking elements 129, latching tongues 130, noses 131, detents 132, grooved structures 133 and/or slits 134 in whatever number and form desired for holding at least one end cap 200 and at least one adapter member 700 in a force-fit and/or positive fit manner and/or by a frictional connection.

The end cap 200 may be provided with fixation members 201, front sides 202, cable attachment sections 203, rear sides 204, collars 205, bases 206, plates 207, fixation structures 208, fixation elements 209, outlets 210, through-holes 211, bodies 212, ribs 213, bevels 214 and/or inlets 215 in whatever number and form required for affixing and guiding a transmission cable 300 as well as transmission lines 303 thereof and in order to be connected to the guiding support 100 in a force-fit and/or positive fit manner and/or by a frictional connection.

The transmission cable 300 may be any kind of cable that uses transmission lines 303 in whatever number and form desired for transmitting data, signals and/or power. For example, the transmission lines 303 may be fiber optics or copper strands. The transmission cable 300 may be provided with a sheath 301 and/or strength members 302 in whatever number and form desired.

The terminal 400 may have a mounting section 401 in whatever form and shape desired for affixing the terminal at an adapter member 700 and/or in the seat 104. The terminal 400 may be any kind of connector, e.g. an optical and/or electrical plug-in connector desired for a particular application.

The boot 500 may have a main section 501, a transition section 502 and/or notches 503 in whatever form and number desired. The boot 500 may be pre-manufactured and may slid over the other parts of the terminal unit 1 or may be molded to the terminal unit 1.

The seating member 600 may be provided with beadings and/or grooves 602 in whatever number and form desired for a certain application. The seating member may have an annular shape or any other required shape.

The adapter member 700 may comprise base bodies 701, through holes 702, frames 703, latching members 704 and/or latching elements 705 in whatever number and form desired for establishing a force-fit and/or positive fit as well as a frictional connection with the seat 104. The adapter member 700 may be formed integrally with the terminal 400. In other words, the terminal 400, in particular the mounting section 401 of the terminal 400, may comprise the adapter member 700.

The rim 800 may have tubular sections 801 and hoops 802 in whatever number and form desired for being placed around the end cap 200 and/or the strength member 302. When assembling a terminal unit 1 according to an embodiment of the present invention, the guiding support 100, the end cap 200, the transmission cable 300, the terminal 400, the boot 500, the seating member 600, the adapter member 700 and/or the rim 800 may be assembled in whatever (chronological) order as desired and feasible for a certain application. Hence, the first pre-assembled state PA, the second pre-assembled state PB and/or the third pre-assembled state PC mentioned herein do not have to be obligatorily followed in the order described herein.

The above described embodiments present a number of advantages over the prior art. These include that any crimping procedure of a ferrule placed around a layer of Kevlar or a central strength member 302 may be omitted. Therefore, costs may be reduced.

Additionally, since the width and/or height of the channel 105 may exceed a diameter of the transmission line 303, a free space for laterally and/or vertically moving the transmission line 303 within the channel 105 may be provided. The cable 300 may be received laterally and/or vertically displaceable within the channel 105. Thus, storing an over-length of the transmission line 303 may be facilitated.

The holding structure 102 may comprise at least one slot 106 extending essentially perpendicularly to the at least one channel 105. Within the slot 106, the fixation member 201 of the end cap 200 may be received, so that any stresses acting especially in a longitudinal direction of the cable 300 may be easily supported at the guiding support 100 such that the fixation member 201 engages the slot 106 and is immobilized herein.

The vertical elasticity and/or lateral elasticity of the guiding support may exceed a longitudinal elasticity of the guiding support 100. Thereby, the terminal 400 may be flexibly moved in the vertical and/or lateral direction with respect to the end cap 200 while a distance of the terminal 400 to the end cap 200 measured in the longitudinal direction of the cable 300 may essentially stay the same. This facilitates handling the terminal unit 1 while at the same time strain relief is ensured in order to protect the transmission line 303 from undue stresses which could occur between the end cap 200 and the terminal 400.

Recesses, e.g. slits 134, may be formed in a top wall 114a, a bottom wall 114b and/or a sidewall 112 of the guiding support 100, so that an elasticity of the top wall 114a, the bottom wall 114b and/or the sidewall 112 is enhanced. Thereby, flexibility of the guiding support 100 may be easily enhanced while, at the same time, material for manufacturing the guiding support 100 may be saved.

What is claimed is:

1. A guiding support comprising:
   a holding structure positioned on a rear end and engageable with a fixation member of an end cap;
   a seat positioned on a front end and engageable with an adapter member of a terminal;
   a first transmission line receiving channel positioned along a longitudinal axis of the guiding support extending from the rear end to the front end;
   a second transmission line receiving channel positioned along the longitudinal axis of the guiding support extending from the rear end to the front end;
   a partition extending along the longitudinal axis and having a bridge connecting the holding structure to the seat, the partition separating the first channel and the second channel; and
   having a vertical elasticity or a lateral elasticity that exceeds a longitudinal elasticity.

2. The guiding support according to claim 1, wherein a width of the first channel exceeds a diameter of a transmission line.

3. The guiding support according to claim 2, wherein a height of the first channel exceeds the diameter of a transmission line.

4. The guiding support according to claim 1, wherein a height of the first channel exceeds a diameter of a transmission line.

5. The guiding support according to claim 1, wherein the holding structure comprises a slot extending essentially perpendicular to the first channel.

6. The guiding support according to claim 1, further comprising a passage formed in a divider positioned between the holding structure and the first channel.

7. The guiding support according to claim 1, wherein the holding structure further comprises a counter fixation member engageable with the end cap.

8. The guiding support according to claim 7, wherein the counter fixation member is positioned laterally to the longitudinal axis.

9. The guiding support according to claim 1, wherein the seat includes a front opening.

10. The guiding support according to claim 1, further comprising slits formed in a top wall, a bottom wall, and/or a sidewall.

11. The guiding support according to claim 10, wherein the top wall, the bottom wall, and/or the sidewall include a grooved structure.

12. The guiding support according to claim 1, further comprising a first shell and a complimentary second shell extending from the rear end to the front end.

13. A kit for terminating a transmission cable comprising:
   a guiding support having a holding structure positioned on a rear end, a seat positioned on a front end, first and second transmission line receiving channels positioned along a longitudinal axis of the guiding support extending from the rear end to the front end, and a partition extending along the longitudinal axis and having a bridge connecting the holding structure to the seat, the partition separating the first channel and the second channel; and
   an end cap having a fixation member engageable with the holding structure; and a terminal having an adapter member engageable with the seat.

* * * * *